Aug. 24, 1943.     W. H. BENNETT     2,327,588
APPARATUS FOR CONVERSION OF ENERGY
Filed June 1, 1940     3 Sheets—Sheet 1
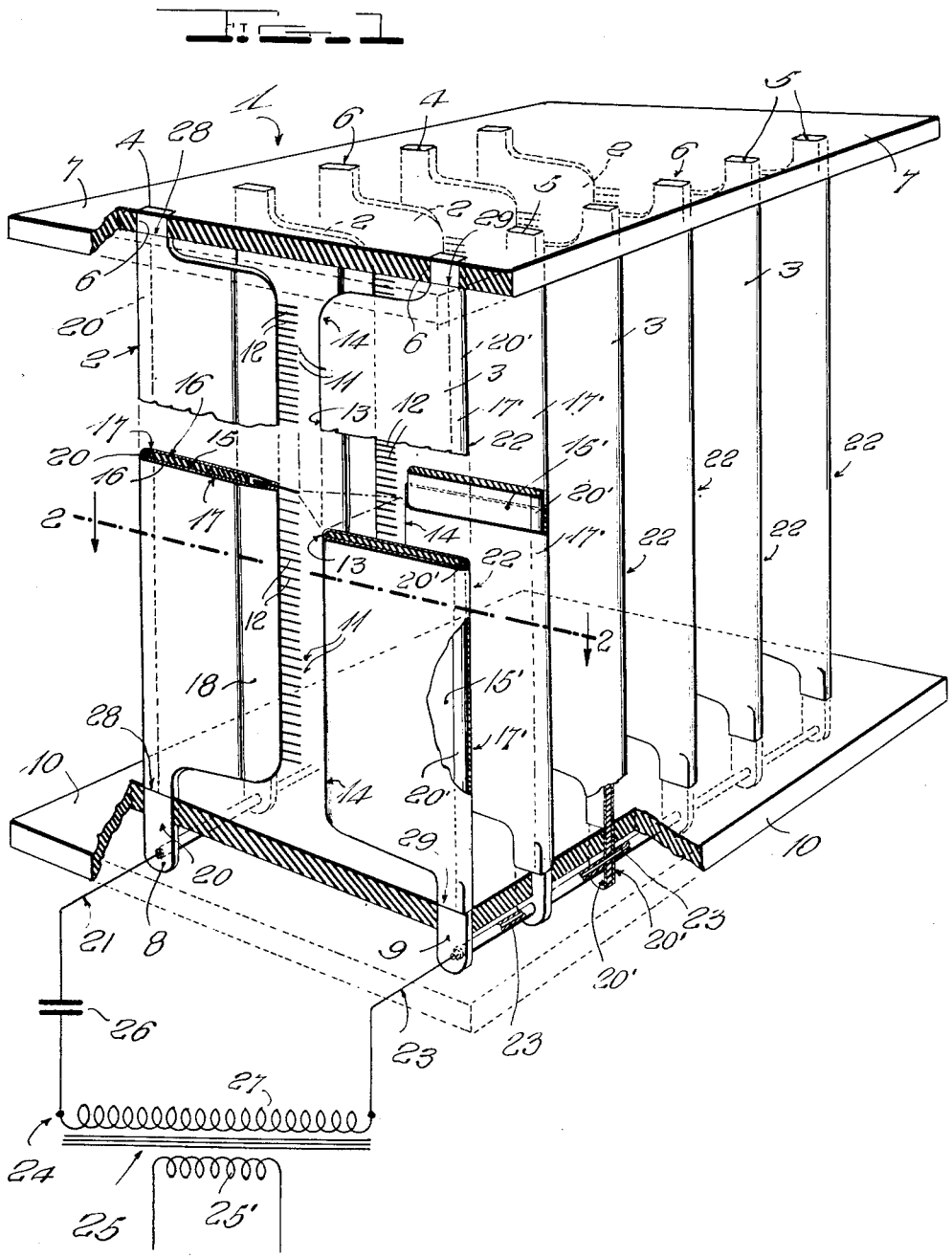
INVENTOR.
Willard H. Bennett,
BY
John B. Brady
Attorney Aug. 24, 1943.   W. H. BENNETT   2,327,588
APPARATUS FOR CONVERSION OF ENERGY
Filed June 1, 1940   3 Sheets-Sheet 2
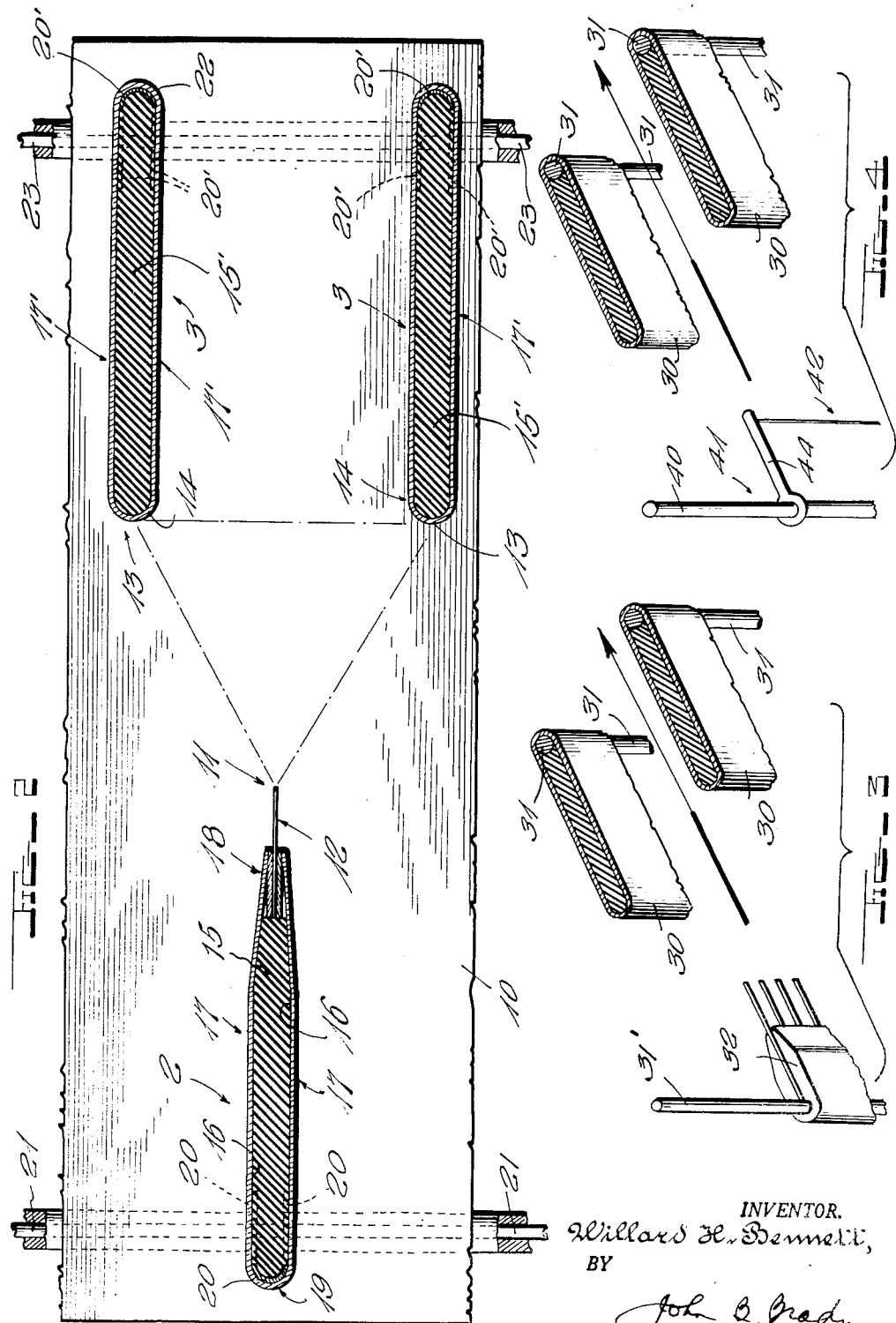
INVENTOR.
Willard H. Bennett,
BY
John B. Brady
Attorney

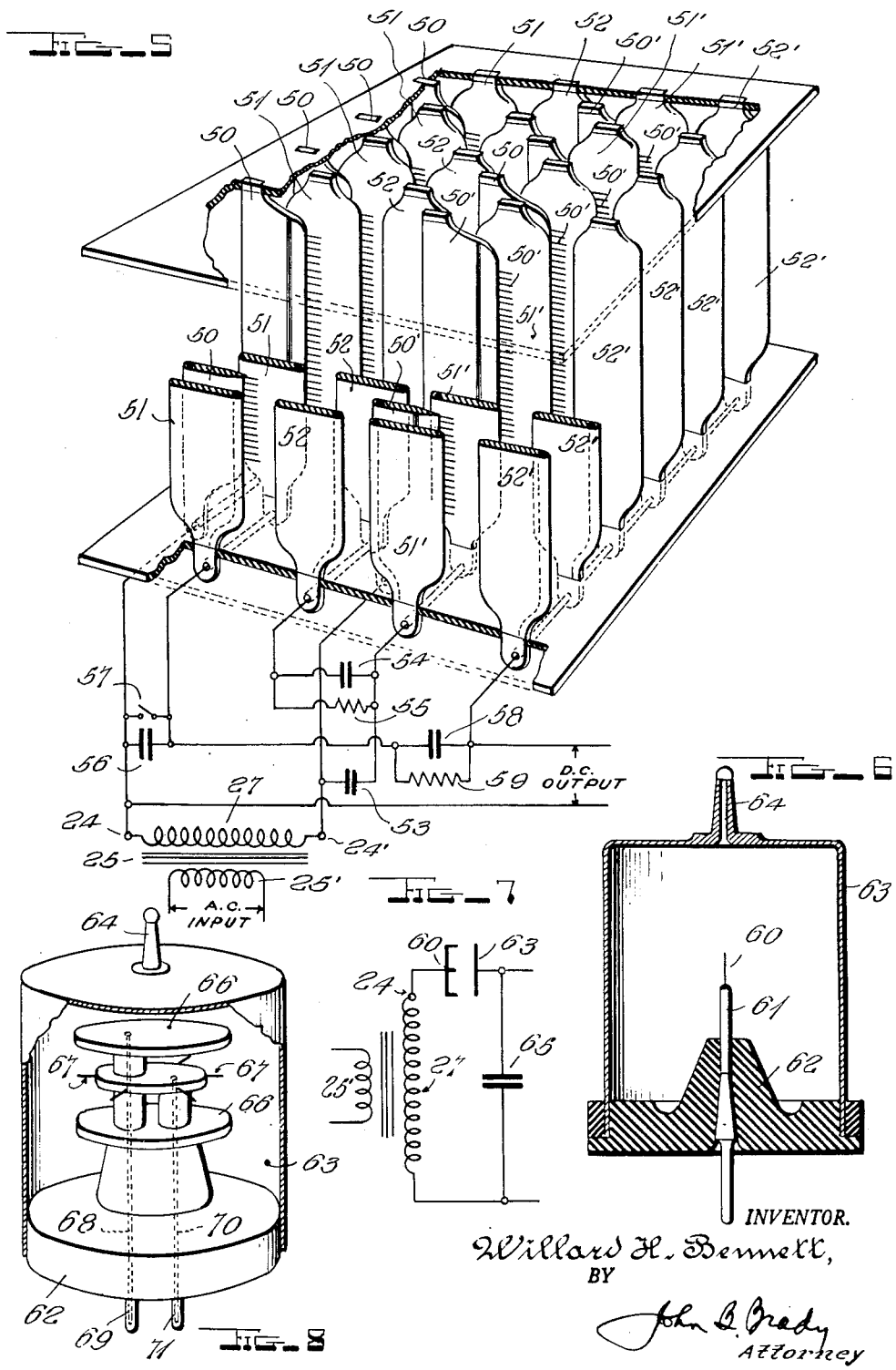

Patented Aug. 24, 1943

2,327,588

UNITED STATES PATENT OFFICE 2,327,588

APPARATUS FOR CONVERSION OF ENERGY

Willard H. Bennett, Newark, Ohio, assignor, by mesne assignments, to Games Slayter, Newark, Ohio Application June 1, 1940, Serial No. 338,379

4 Claims. (Cl. 315—326)

My invention relates to the conversion of one form of electrical energy into other forms of energy by use of what I term a diffuse discharge. This diffuse discharge is the discharge through air or gases of currents substantial enough for practical energy conversions by virtue of ionizations in immediate proximity to an electrode or electrodes, and drift in a diffuse, that is to say non-channeling manner, of charge across the gap without any visible light being produced in the main portion of the gap by the passage of the charge.

This application is a continuation-in-part of my application Serial No. 179,619, filed December 13, 1937, for Method and apparatus for electrically generating pressures.

An object of the invention is to provide apparatus for the conversion of electrical energy, direct or alternating, into the kinetic energy of motion of fluids.

A further object of the invention is to provide apparatus for the conversion of alternating current energy to direct current energy.

Still another object of my invention is to provide a construction of an electrical discharge system employing a discharge member and a collecting electrode including means for producing a diffuse discharge by maintaining the discharge free from surging, streamering (corona), and other disruptive conditions in the discharge in order to operate the discharge at sufficient current density to be practical for the conversion of power from one form into another.

Numerous other and further objects of my invention will be apparent from the description and the accompanying drawings in which:

Fig. 1 is a perspective view of a single bank model air-type fan;

Fig. 2 is a cross section of a portion of Fig. 1, taken on the lines 2—2 thereof;

Figs. 3 and 4 show modified forms of electrodes which may be used in the fan disclosed in Fig. 1;

Fig. 5 is a perspective view of an air-type rectifier embodying my invention;

Fig. 6 is a cross sectional view of a gas-type rectifier embodying the principles of my invention;

Fig. 7 is a wiring diagram of the rectifier shown in Fig. 6; and

Fig. 8 is a perspective view of a triode-type gas discharge device.

Prior to my original abandoned application Serial No. 179,619, filed December 13, 1937, for Method and apparatus for electrically generating pressures, this diffuse discharge, to the best of my knowledge, had never been recognized as a form of discharge different from arcing, sparking, glow, and corona type of discharges. Because of the extreme newness of this field, it was described in that application as "silent electric discharge" and a form of discharge which was produced "without surging or arcing adjacent the discharge members." (Page 2 specification, lines 7 and 8.)

In paragraph 2 of page 2 of my original specification, it was pointed out that an object of my invention resided "in the selection of materials for the discharge members in a co-acting group of electric discharge members by which the effective discharge potential at the discharge points of each of the discharge members may be controlled for securing the integral effects of the discharge from all of the discharge members while avoiding the production of surges or arcs."

In order to achieve the advantages obtained by the discharge system of my invention and integrate the effects of a plurality of electric discharges in the atmosphere, air, gases and/or fluid media, the current at each of the discharge members of the multiplicity of coacting discharge members is accurately controlled and predetermined. The specification of application Serial No. 179,619 supra, stated at page 4, commencing at line 6, "The control of current may be secured by introducing ballast resistors in series with each of the discharge members or the discharge members may be selected as to size and conductivity as will determine the current at the discharge points and prevent the occurrence of surges and resultant detrimental arcing." The specification of said application disclosed apparatus and methods for accomplishing this result.

The production and maintenance of a diffuse discharge makes practical for the first time the conversion of electrical energy into other forms of energy by the use of an electrical discharge at high voltage in air and/or other gases at approximately atmospheric pressure. This is true because in the diffuse discharge employed in this invention all of the wasteful and destructive features of streamers, sparks, and arcs are avoided and eliminated. For example, the large amount of heat in an electric arc is avoided, and the disruptive fluctuations in a sparking or streamering form of discharge is also avoided.

In terms of the diffuse discharge gases may be divided into two classes—electron attaching gases and free electron gases. Examples of electron attaching gases are oxygen, sulphur dioxide, chlorine and ammonia. Examples of free electron gases are hydrogen, nitrogen, helium and neon. Mixtures of electron attaching and free electron gases behave, for the purposes of this invention, as electron attaching gases unless the proportion of electron attaching gases in the mixture is very small. Thus air, which consists predominantly of the free electron gas nitrogen, but contains the electron attaching gas oxygen, among others, is electron attaching for the purpose of this invention. Commercially available supplies of gases nominally free electron are usually so contaminated with electron attaching gases as to make them electron attaching for the purpose of this invention. For use in forms of apparatus for using the diffuse discharge which require free electron gases it is therefore usually necessary to purify the commercial gases for this use. I have found sustained electrical discharges from sharp points convenient means for purifying commercial gases for this purpose.

Electron attaching gases, especially air, are particularly useful for the conversion of electrical energy to kinetic energy though they can be used for the conversion of one form of electrical energy to another form of electrical energy. Free electron gases are particularly useful for the conversion of one form of electrical energy to another.

The means used for producing and maintaining a diffuse discharge in electron attaching gases, make use of various forms of electrodes which have a distributed electrical admittance. The distributed admittance of an electrode is a term used to designate the measure of the maximum current density in the gas next adjacent the electrode which the electrode can sustain and convey either transiently or under steady conditions.

With reference to my invention more in detail, there will be seen in Fig. 1 a perspective view of a fan 1, embodying my invention. In the present instance this fan comprises a row of discharge or emitting electrodes 2 held in spatial relation to one another, and to a similar row of collecting electrodes or targets 3. Both types of electrodes have their upper ends 4 and 5 suitably mounted in grooves 6 of a top dielectric plate 7. The lower ends 8 of the discharge electrodes, and 9 of the collecting electrodes extend through the dielectric base 10 of the fan. It will be noticed that the electrodes 2 are spaced from electrodes 3 in such a manner that each electrode 2 is in a plane midpoint between two adjacent electrodes 3, as may be seen more clearly in Fig. 2. From the tips 11 of the wires 12 of each of the discharge electrodes to the center 13 of the backs 14 of the two collecting electrodes in front thereof is approximately one inch. The position of the wire tips 11 to the centers of electrodes 13 is such that they form the three corners of an equilateral triangle.

As can be seen in Fig. 2, the discharge electrodes 2 each consist of a core 15 of insulating material, in the present instance 1½" long and ⅛" thick. In the present instance the core is formed from pressed board, but other suitable insulating materials such as wood, cardboard, or plastic may be used. Over the surface 16 of the core is secured a layer of semi-conducting material 17. This material has a conductivity of the order of magnitude 100 megohm cm. per cm. and is approximately .005 of an inch thick. In the present instance the semi-conducting material 17 is a paper fabricated with carbon black. There may be substituted for the semi-conducting paper an ink or paint containing semi-conducting oxides with the necessary resistivity.

To the front edge 18 of the conducting material 17 is secured a row of discharge segments of wire 12, approximately 0.001 inch in diameter and about one-half inch in length. These wire segments are spaced parallel to one another approximately one-sixteenth inch apart and are secured to the conducting material 17 between the adjacent front edges thereof by a semi-conducting cement. Extending from the end 8 of the electrode along the entire length of edge 19 thereof, is a stripe of semi-conducting ink or aquadag 20, which has a resistivity which is small compared to the resistivity of the material 17. This stripe 20 acts as a bus from the wire 21 to the individual wires 12 through the medium of the material 17.

The collecting electrodes 3 consist of a pressed board core 15' over which is mounted a semi-conducting paper 17'. There is also applied to the paper 17' on this collecting electrode an aquadag bus 20' which extends the full length of edge 22 down to the lower end 9 at the place where wire 23 is joined to that end.

Wire 21 is connected to tap 24 at one side of transformer 25 through a blocking condenser 26. In the present instance the transformer is a 15,000 A. C. type and the condenser has a capacity of .01 microfarad. Wire 23 extends to the other side of winding 27 of the transformer 25, thus completing the circuit.

It should be noticed that edge portions 28 of electrodes 2, and 29 of electrodes 3, have been cut away from the top and bottom plates 7 and 10 so as to eliminate the possibility of electrical stress and subsequent streamering at the juncture of the electrodes and the plates.

The operation of the fan is as follows. The alternating potential of the transformer 25 is transferred through the condenser 26 to the wires 12 by the medium of bus 20 and resistive material 17. This potential when placed between the wires 12 and the collecting electrodes 3 serves as a source of energy for the discharge from the wires to the collecting electrodes. The size of each wire segment 12 and the resistance of material 17 cooperate to restrict the admittance through each wire segment to a small enough value to maintain the discharge in a diffuse form so as to give a total admittance through the whole of the electrode 2 allowing substantial and practical conversion of power.

Since the fan is operating in ordinary air, the wires 12 gradually accumulate a certain amount of dust as well as a small layer of oxide. Because of this it is advisable not only to use wires of a diameter of about .001 of an inch, but also to use a type of wire material which will resist the formation of oxides thereon. A suitable material has been found in wires having a nickel alloy core over which is electro-plated a thin layer of rhodium. Such a wire will not grow an oxide coat indefinitely and thus is capable of maintaining the discharge in the diffuse state.

The thinness of the material on the collecting electrodes 3 is even more important here than it is on electrodes 2 and can be as low as .001 of an inch for the reason that attempts to use a bulk resisting material instead resulted in the discharge having a tendency to localize in spots on the surface of the electrode 3. This localization was apparently due to some kind of instability in the resistive material itself; that is to say, the more the current tended to flow towards one spot, the greater the current density in that spot. This resulted in creating a 'hot spot' at that surface of the bulk resistor or, in other words, caused ionization immediately adjacent the surface of the collecting electrode.

In a bulk resistor, a 'hot spot' forms immediately when dust particles land thereon. The thin layers of semi-conducting material such as 17' used in this device avoids this difficulty. This would seem to be due to the fact that should a 'hot spot' form, it would be thinner than it is wide and radiation of heat away from such a hypothetical incipient spot would be too rapid to support production of a 'hot spot.'

With an applied potential of about 15,000 volts A. C. (root-mean-square) it is necessary that the distance from the bus in the collecting electrode to the rounded edge of that electrode should be approximately 1½". If this distance is too short there is a tendency for the discharge to go into a streamer formation discharge and such streamers produce sparks which arise at the discharge tips, direct themselves toward the rounded leading edge of the collecting electrode, and then detour around in the gap to the bus. If the resistivity of the semi-conducting material 17' is too low there is a tendency for the discharge to go from the discharge tips of wires 12 to the rounded leading edge 14 of the collective electrodes, in the form of a spark-over. This does not happen when the semi-conducting material 17' has a resistivity of approximately 100 megohms cm. per cm.

Thus through the cooperation achieved between the size of the wires 12, the resistivity of the bus 20, and the thickness and resistivity of semi-conducting materials 17 and 17', there results in the gap a condition in which the admittance in that gap is limited, and spatially distributed. This is another way of saying that there is a control of the maximum current density which can occur in the air adjacent to the electrode.

With diffuse discharge resulting from establishing a limited spatially distributed admittance in the gap many incidental factors such as dust particles momentarily striking the surface of the collecting electrode cannot produce a local increased density so as to throw the discharge out of the diffuse form and into a streamering one.

Thus this fan by producing a diffuse discharge ionizes the particles of air adjacent the emitter wires 12 and repels the same from the wires. In this manner a movement of air is accomplished in a silent steady and even manner from a device which does not have any similarity with the disruptive forms of discharge of the arcing, sparking and corona type.

With reference particularly to Fig. 3, there will be seen a collecting electrode 30 differing only from electrode 3 in that a wire bus 31 is used instead of the aquadag bus 20'. The discharge electrode 32 differs from electrode 2 in that a wire bus 31' is used and there is a direct metallic connection between that bus and the wires. In other respects, however, it is the same as electrode 2.

In this form of discharge device it is necessary to observe the same restrictions with respect to wire size and composition as was used before and in addition it is necessary that this discharge device shall be operated in dust-free air. The collection of dust on the wire can produce a conversion of the discharge over from the diffused form into the streamering corona form, just as the oxide growth could produce if allowed to accumulate to too great a thickness at the end of the wire tips.

Still another alternative form of electrode 41 is disclosed in Fig. 4 and it may be used with either form of collecting electrode 3 or 30 but is shown as used with electrode 30. This electrode 41 consists of a straight wire 42 spaced parallel to, and laterally outwardly from wire bus 40, through metallic arms 44. In this modification, the discharge takes place from the wire 42 towards the collecting electrode. Here again the limitations which are of principal importance are that this kind of electrode must be used in dust-free air. There is also an additional precaution that this form of discharge electrode cannot be used for as long a time as the discharge electrode shown in Figs. 2 and 3 because the discharge electrode in Fig. 4 gradually etches through because of oxide formation and the wire eventually breaks. The wire form of emitter 42 is particularly efficient for operation from D. C. power supply currents with the wire positive.

In Fig. 5 another form of my invention is shown. This also operates in air and produces rectified D. C. potential from an applied A. C. potential.

A row of emitting electrodes 50 is mounted as shown and in spatial relation thereto I arrange control electrodes or first grid bank shown at 51 and first target bank 52. The second complement of electrodes comprises similar emitters 50', similar control electrodes or second grid bank 51', and second target electrode bank at 52'. A power supply similar to that shown in Fig. 1 is provided consisting of a transformer 25 having primary winding 25' and secondary winding 27. One end of secondary winding 27 at 24 is connected to emitter bank 50. The other end of secondary winding 27 connects through condensers 53 and 54 with the bank of target electrodes 52. Condenser 54 is shunted by resistor 55. A connection is taken through condenser 56 to grid banks 51. The succeeding bank has a connection from emitting electrodes 50' to the end 24' of the secondary winding 27. The target electrodes 52' are connected through resistors 59 shunted by condenser 58 and connected in series with condenser 56 to the end 24 of secondary winding 27. The control electrodes 51' are connected through condenser 53 with the end 24' of secondary winding 27. Bias potential built up across condenser 53 is impressed between control electrodes 51' and discharge electrodes 50'. Bias potential built up on condenser 56 is impressed between control electrodes 51 and discharge electrodes 50 which may be momentarily removed by short circuiting switch 57.

By momentarily closing the short circuiting switch 57 upon initiating the application of applied A. C. from the transformer, the discharge from the discharge bank 50 is predominantly negative in polarity and so an excess of negative charge accumulates on the first collecting bank 52. This excess negative charge is distributed across condensers 53 and 54 in cascade but due to the effect of the leak resistor 55 the charge of the condenser 54 is relieved to accumulate on 53 thereby placing upon the second grid bank 51' the negative bias voltage due to the bias of the discharge from electrodes 50'. Due to the negative charge on the second control bank 51', the natural bias of the discharge of the second discharge bank 50' is overcome and in fact is reversed so that discharge from this bank 50' is predominantly positive in polarity. This excess of positive charge continues to accumulate on collecting electrodes 52' and this positive charge is stored on condenser 58 and slowly leaks off through the leak resistor 59. Of course, no charge can accumulate on 56 under the present circumstances because the short circuiting switch 57 has been held shut.

At any time now the switch 57 may be opened while the power is being applied. Immediately that the switch is opened the leakage of charge through 59 allows the positive charge on 58 to be stored across 56. This storage of positive charge on condenser 56 still further biases the discharge from the first discharge bank 50 to cause this bank to discharge excess negative charge so that the bank 50 discharges more and more negative causing the discharge bank 50' to discharge more and more positive and each biased discharge still further biases the other. This build-up of rectified discharges in the two component sets of electrodes continues until the lateral diffusion of charge from respective discharge electrodes to coacting grid electrodes equals the leakage rate of current through the respective leak resistors 55 and 59, this leading to stable operation.

The capacities of condensers 53, 54, 56 and 58 are of the order of $\frac{1}{100}$ microfarad but these values are not critical. The leak resistances 55 and 59 around the condensers are of the order of 50 megohms. A short circuiting switch could be used across the other condensers in which event the output from this form of rectifier would be made negative by closing the switch momentarily at the beginning of the operation of the rectifier. The output of power is delivered at the D. C. output as shown in the drawings. The totality of discharge from the device is predominately positive in polarity thus minimizing the production of ozone.

Referring to Fig. 6 I have shown a form of gaseous rectifier which may be used in carrying out the principles of my invention. In this arrangement an emitting wire 60 is carried by supporting member 61 mounted in suitable insulating base 62 with respect to which the metallic envelope 63 is suitably sealed. The envelope 63 serves as a collecting electrode with respect to the emitting wire 60. A free electron gas is enclosed within the envelope 63 the gas being introduced by any suitable method through the sealing of tip 64. In one form of my invention hydrogen may be used for the gas and steel wire used for the discharge member 60. In this case by gradual application of voltage in the early stages of the operation of the device, the passage of discharge itself eliminates electron attaching impurities and produces a gaseous medium which will convey a diffuse discharge by free electron conduction.

In Fig. 7 I have shown a typical circuit in which the rectifier of Fig. 6 may be employed. The power transformer is provided in a manner similar to that explained in Figs. 1 and 5 wherein one end 24 of secondary winding 27 connects to the emitters 60 and the other end of the secondary winding 27 connects to the load. The opposite side of the load connects to target or collecting electrode 63. Condenser 65 is connected across the load for suitably smoothing the current which is rectified and supplied to the load.

In this device I have found that certain metals used as wire emitters tend to grow filaments from the collector wall 63 which develop arc back in the course of time. Steel wire has little or none of this effect and is therefore to be preferred. I have found that steel wire of .003" is desirable in a device having an envelope 63 of approximately 2" in diameter, and that a current of 0.3 milliampere can be effectively obtained.

In the fabrication of devices of this type, materials such as after-baked Bakelite are used for the insulated sealing portion of the rectifier to avoid contamination of the gas by electron attaching vapors.

In certain applications of my invention, I employ in association with the emitting and collecting electrodes a control electrode. Fig. 8 is a perspective view of one form of my invention employing control electrodes 66 in association with the emitters 67. The target or collecting electrode is shown at 63 similar to the arrangement shown in Fig. 6. The control electrodes 66 are each disposed in spatial relation to the emitters 67 on opposite sides thereof and are connected through conductor 68 to terminal pin 69 for completing connection with an external circuit. Conductor 70 connects to emitter 67 and connects to pin terminal 71 for establishing connection with an external circuit. The envelope 63 is filled with suitable free electron gases as described in connection with the structure of Fig. 6. The radius of curvature of the edge of the control electrodes 66 for a 4" diameter envelope 63 is approximately $\frac{1}{8}$".

Diffuse discharge is not to be confused with other forms of discharge which also occur in gases such as arc, spark and corona and glow discharge. For example, electric arcs have been used for the conversion of electric energy into heat, as in steel-making furnaces, in electric welding, and in the conversion of D. C. energy to A. C. energy as in the Poulson arc oscillators. Arcs are formed when a gap between electrical conductors is connected to a circuit capable of applying a voltage sufficient to jump the gap and thereafter maintain a strong current across the gap. When the current flow across an arc increases the voltage drop across the arc decreases. Arcs are flame-like in appearance, produce much heat, light, and noise. Arcs cause interference with nearby radio receiving circuits, as may be noticed when some domestic oil-burning furnaces are operated.

When a gap between electrical conductors is connected to a circuit capable of supplying sufficient voltage to jump the gap but incapable of supplying current for more than a very brief time, a spark is formed. A familiar example of a spark is a bolt of lightning. When the circuit used can supply only a very small current even for a brief period, sparks may be nearly invisible and the loud report characteristic of strong sparks may degenerate to a mere snap. Sparks produce crashing noises in adjacent radio receiving circuits.

When the voltage applied to a gap between electrical conductors in air by a circuit capable of supplying large currents, is gradually increased either an arc forms in the gap or phenomena, known as corona, sets in, depending on the shape and separation of the electrodes. Corona may take the form of luminous, flickering streamers radiating from the electrodes and terminating in the air, or it may take the form of a glow near the surface of the electrodes. This glow presumably consists of many fine luminous streamers too small to be individually distinguished by the eye. Electrically, corona is characterized by unsteadiness. Rumbling and crashing noises are produced in nearby radio receiving circuits. Audible noise is usually also produced; an example is the faint rustling noise often heard near high-tension power lines. Corona has been called the silent electric discharge. It is far less noisy than arcs or sparks in circuits of comparable power but it is not completely silent.

In gases at pressures substantially below that of the atmosphere, and usually much below one-tenth atmospheric pressure, a different type of discharge, known as the glow discharge, is used for the conversion of energy. The glow discharge is silent and may or may not affect nearby radio receiving circuits. As the name implies, a visible glow fills the gap between the electrodes.

The diffuse electric discharge, with which this invention is concerned, differs from the arc, spark, corona, and glow discharges in important respects. The only visible phenomenon is a faint luminosity in the immediate neighborhood of one or more electrodes. It is completely silent both audibly and with respect to radio interference. The flow of current is steady so that the discharge has no effect on the operation of nearby radio receiving circuits. The diffuse discharge has the property that increasing the current through the gap increases the voltage across the gap.

The means used for producing and maintaining a diffuse discharge in electron attaching gases, makes use of various forms of electrodes which have a distributed electrical admittance. The distributed admittance of an electrode is a term used to designate the measure of the maximum current density in the gas next adjacent the electrode which the electrode can sustain and convey either transiently or under steady conditions. Another way of describing the concept of admittance is to say that the size and spacing of the electrodes are chosen to be cooperative with the distributed resistance of the circuit so as to limit the maximum current density of charge arriving through the gas.

The means used for producing and maintaining of diffuse discharge in free electron gases makes use of electrodes which are conductive in character but which are selected as to size, shape, and position, and conditions of operation of the discharge which result in maintaining the free electron gases free from electron attaching impurities.

My invention includes electrical discharge apparatus for producing a form of energy different from the form of electrical energy supplied to the apparatus. The apparatus might generally be referred to as (1) a target which may be solid, or with an open structure; (2) an electric emitting system consisting of fine wires, sharp points, fine wire ends, or other sharp corners or edges; (3) and means for maintaining the discharge between said electric emitting system and said target free from streamering, sparking and arcing conditions in gases at pressures where cumulative or avalanching ionization by collision can be used for the production of current without visible luminosity in the main portion of the gap, these means to include restrictions on (a) the size of the discharge points, corners or edges, (b) the structure and resistance distribution of the target, (c) the structure and resistance distribution of the electric emitting system, (d) the composition of the gas, (e) the character of the applied voltage, and (f) the distributed admittance of the discharge electrode, target or discharge system—these means to be used either separately or in combination in accordance with the teachings disclosed.

While I have described my invention in certain preferred embodiments, I realize that modifications may be made and I intend no limitations upon my invention other than may be imposed by the scope of the appended claims.

What I claim as new and desire to secure by Letters Patent of the United States is as follows:

1. Apparatus for converting electrical energy to another form of energy comprising an electric circuit, a target electrode in said circuit, an emitting electrode also connected in the circuit and spaced from the target electrode, means for supplying electrical energy to the circuit to obtain a sufficient difference of potential between the electrodes to effect an electric discharge therebetween, the surface of the target electrode opposite the emitting electrode having a resistivity sufficient to prevent ionization in the region immediately adjacent the target electrode and the emitting electrode having resistive characteristics predetermined with respect to the resistivity of the target electrode to provide a current density in the region of the emitting electrode which the latter can sustain and convey either transiently or under steady conditions free from streamering, arcing and sparking.

2. Apparatus for converting electrical energy to another form of energy comprising an electric circuit, a target electrode in said circuit, an emitting electrode connected in the circuit and spaced from the target electrode, means for supplying electrical energy to the circuit to obtain a sufficient difference of potential between the electrodes to effect an electric discharge therebetween, the surface of the target opposite the emitting electrode having a resistivity predetermined with respect to the remaining electrical characteristics of the circuit to prevent ionization in the region immediate adjacent the target electrode and the emitting electrode having resistive and capacitive characteristics so determined with respect to the spacing between the electrodes to provide a current density in the region of the emitting electrode which the latter can sustain and convey either transiently or under steady conditions free from streamering, arcing and sparking.

3. Apparatus for converting electrical energy to another form of energy comprising an electric circuit supplied with electrical energy from a source of supply, a discharge electrode and a target electrode connected in the circuit in a manner to provide an electric discharge therebetween, the discharge electrode having a body portion and having an emitting portion connected to the source of supply by a thin coating of semi-conducting material on the body portion, the resistivity of the semi-conducting coating being predetermined with respect to the remaining electrical characteristics of the circuit to provide a current density in the region of the emitting electrode which the latter can sustain and convey either transiently or under steady conditions free from streamering, arcing and sparking.

4. Apparatus for converting electrical energy to another form of energy comprising an electric circuit supplied with electrical energy from a source of supply, a discharge electrode having a body of dielectric material provided with a coating of semi-conducting material and having an emitting point electrically connected to the source of electrical supply through the medium of a said semi-conducting material, a target electrode also having a thin coating of semi-conducting material and electrically connected in the circuit in such relationship to the discharge electrode to provide for obtaining an electric discharge therebetween, the resistivity of the coatings of semi-conducting materials on both electrodes and the capacitance characteristics of the discharge electrode being predetermined to provide a current density in the region of the emitting point which the latter can sustain and convey either transiently or under steady conditions free from streamering, arcing and sparking.

WILLARD H. BENNETT.